United States Patent
Cantrill (10) Patent No.: US 8,627,294 B1
(45) Date of Patent: *Jan. 7, 2014

(54) METHOD AND APPARATUS FOR SYNCHRONIZATION IN A MULTIPLEXED ARBITRARY-ACTION TRACING FRAMEWORK

(75) Inventor: Bryan M. Cantrill, San Francisco, CA (US)

(73) Assignee: Oracle America, Inc., Redwood Shores, CA (US)

( * ) Notice: Subject to any disclaimer, the term of this patent is extended or adjusted under 35 U.S.C. 154(b) by 3173 days.

This patent is subject to a terminal disclaimer.

(21) Appl. No.: 10/713,338

(22) Filed: Nov. 14, 2003

(51) Int. Cl.
*G06F 9/44* (2006.01)

(52) U.S. Cl.
USPC .......................... 717/130; 717/127; 717/131

(58) Field of Classification Search
None
See application file for complete search history.

(56) References Cited

U.S. PATENT DOCUMENTS

| | | | | |
|---|---|---|---|---|
| 5,677,997 | A * | 10/1997 | Talatik | 706/45 |
| 5,758,061 | A * | 5/1998 | Plum | 714/35 |
| 6,083,281 | A * | 7/2000 | Diec et al. | 717/128 |
| 6,163,793 | A * | 12/2000 | Gerber et al. | 718/103 |
| 6,351,844 | B1 * | 2/2002 | Bala | 717/128 |
| 6,848,046 | B2 * | 1/2005 | Zimmer | 713/100 |
| 6,957,421 | B2 * | 10/2005 | Hundt et al. | 717/130 |
| 7,039,919 | B1 * | 5/2006 | Hunt | 719/316 |
| 7,058,928 | B2 * | 6/2006 | Wygodny et al. | 717/128 |
| 7,107,579 | B2 * | 9/2006 | Tsai et al. | 717/127 |
| 7,131,115 | B2 * | 10/2006 | Hundt et al. | 717/130 |
| 7,178,131 | B2 * | 2/2007 | Mitchell et al. | 717/124 |
| 7,207,035 | B2 * | 4/2007 | Kobrosly et al. | 717/128 |
| 2002/0010911 | A1 * | 1/2002 | Cheng et al. | 717/4 |
| 2002/0104074 | A1 * | 8/2002 | Hundt et al. | 717/129 |
| 2002/0198886 | A1 * | 12/2002 | Ramakrishnan | 707/100 |
| 2002/0199172 | A1 * | 12/2002 | Bunnell | 717/128 |
| 2003/0084375 | A1 * | 5/2003 | Moore et al. | 714/34 |
| 2003/0212988 | A1 * | 11/2003 | Tsai et al. | 717/130 |
| 2004/0205720 | A1 * | 10/2004 | Hundt | 717/124 |
| 2006/0242627 | A1 * | 10/2006 | Wygodny et al. | 717/128 |
| 2008/0263044 | A1 * | 10/2008 | Cantrill | 707/8 |

OTHER PUBLICATIONS

Tamches, Ariel and Miller, Barton P. Fine-Grained Dynamic Instrumentation of Commodity Operating System Kernels. [Online] http://www.usenix.org/publications/library/proceedings/osdi99/full_papers/tamches/tamches.pdf, Published Feb. 1999.

Murayama, John. Performance Profiling Using TNF. [Online] http://developers.sun.com/solaris/articles/tnf.html, Jul. 2001.

Lorch, Jacob R. and Smith, Alan J. The VTrace Tool: Building a System Tracer for Windows NT and Windows 2000. [Online] http://msdn.microsoft.com/msdnmag/issues/1000/VTrace/default.aspx, Oct. 2000.

Chapter 10. The Generalized Trace Facility (GTF). [Online] http://publib.boulder.ibm.com/cgi-bin/bookmgr/BOOKS/IEA2V100/CCONTENTS, Jan. 2001.

Mirgorodskii, Alex. The Path to Portable Kernel Instrumentation: The Kerninst API. http://www.dyninst.org/mtg2003/slides/KerninstAPI.pdf, Apr. 2003.

(Continued)

*Primary Examiner* — Tuan Q. Dam
*Assistant Examiner* — Zheng Wei
(74) *Attorney, Agent, or Firm* — Osha Liang LLP (57) ABSTRACT

A method for processing a probe including triggering the probe in an instrumented program, querying a global array to determine an execution control block associated with the probe, and executing the execution control block to obtain data.

15 Claims, 6 Drawing Sheets

(56) References Cited

OTHER PUBLICATIONS

Richard Moore, et al. IBM Dynamic Probes http://www-124.ibm.com/developerworks/opensource/linux/projects/dprobes/README, 2000.

K. Yaghmour et al.; "Measuring and Characterizing System Behavior Using Kernel-Level Event Logging"; Proceeding of the 2000 USENEX Annual Technical Conference; Jun. 18-23, 2000, San Diego, California, USA.

* cited by examiner

METHOD AND APPARATUS FOR SYNCHRONIZATION IN A MULTIPLEXED ARBITRARY-ACTION TRACING FRAMEWORK

BACKGROUND

Analyzing the dynamic behavior and performance of a complex software system is difficult. Typically, analysis of a software system is achieved by gathering data at each system call and post-processing the data. The following is a brief description of conventional tracing frameworks used to analyze software.

The conventional tracing frameworks were typically composed of various independent software modules. The primary source of information accessed by the conventional tracing frameworks is the kernel. The conventional tracing frameworks typically include a trace facility, a trace module, a daemon, and an offline data analysis and processing component. The trace facility gathers information from various components of the kernel and forwards events to the trace module. The trace module subsequently logs the events in its buffer. Periodically, the trace daemon reads the events from the trace module buffer and commits the recorded events into a user-provided file.

Some conventional tracing frameworks, in addition to the aforementioned functionality, included functionality to allow a single point within the source (e.g., a single point with the kernel) to be access by multiple consumers (i.e., multiple processes accessing the conventional tracing framework and requesting data for one or more points within the source). Accordingly, tracing frameworks that include this functionality allow multiple consumers to access the same point in the source.

In the event that a given consumer terminates tracing at a given point within the source or altogether, the tracing framework frees the data structures associated with the consumer. Conventional tracing frameworks have implemented various mechanisms to ensure that when data structures associated with one consumer are freed by the tracing framework, that the action by the tracing framework does not impact the tracing being conduction by other consumers.

Three typical mechanisms that have been implemented by conventional tracing frameworks to ensure that when data structures associated with one consumer are freed there is no impact on the other consumers: (1) allowing one consumer to trace at a time; (2) allowing multiple consumers to trace any point within the source, but disabling tracing for a brief of time for all consumers when a single consumer wishes to cease tracing, and (3) constraining the context in which probes may fire to not include the elements of the system required for synchronization.

SUMMARY

In general, in one aspect, the invention relates to a method for processing a probe, comprising triggering the probe in an instrumented program, querying a global array to determine an execution control block associated with the probe, and executing the execution control block to obtain data.

In general, in one aspect, the invention relates to a method for removing an execution control block associated with a consumer from a linked list executing in a system, wherein the linked list has a first pointer pointing to the execution control block and the execution control block has a next pointer, comprising updating the linked list such that the first pointer is updated to point to same location as the execution control block next pointer, issuing an empty cross-call and awaiting an acknowledgement from each processor in the system, and freeing memory associated with the execution control block when the acknowledgement from each processor has been received.

In general, in one aspect, the invention relates to a system for tracing an instrumented program, comprising the instrumented program comprising a first probe wherein the first probe is identified using a first probe identifier, and a first execution control block associated with the first probe comprising a first action to be performed when the first probe is triggered in the instrumented program.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

The invention relates to a method and apparatus for multiplexing a probe using a tracing framework that supports one or more consumers. Further, the invention relates to method and apparatus for synchronizing a multiplexed probe.

Figure 1:
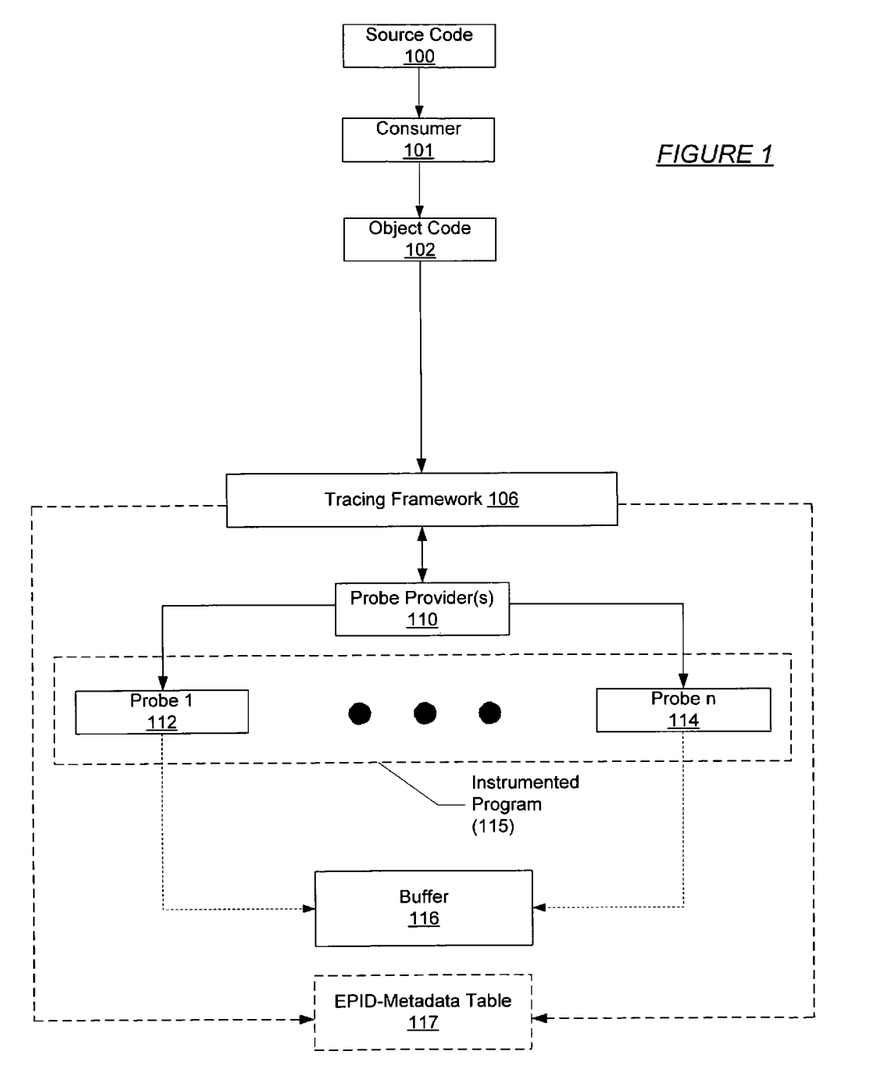
FIG. 1 shows a flow diagram detailing the collection of data in accordance with one embodiment of the invention.

FIG. 1 shows a flow diagram detailing the collection of data in accordance with one embodiment of the invention. Specifically, FIG. 1 provides an overview of the process for collecting data for the buffer (116). Initially, source code (100) is written/obtained/generated that defines a tracing function (i.e., a request to obtain certain data). More specifically, the tracing function defines which probes (112, 114) to enable within the instrumented program (115), and what actions that the tracing framework (106) is to perform when the probes (112, 114) are triggered (i.e., when a program thread executing the instrumented program (115) encounters a probe (112, 114)). In one or more embodiments of the invention, a tracing function may define one or more actions that the tracing framework (106) is to perform when a probe (112, 114) is encountered. Each action defined by the tracing function is identified by an EPID.

The source code (100) is typically associated with a consumer (101). Note that a consumer (101) may define one or more tracing functions. The consumer is a virtual client that sends requests, in the form of tracing functions, to the tracing framework (106) to obtain information about the instrumented program (115). Further, the consumer (101) also retrieves the requested information, which is stored by the tracing framework (106) in the associated buffers (116). EPIDs may be defined on a per-consumer basis or on a per-system basis.

If the EPIDs are defined on a per-consumer basis, the EPIDs are only required to uniquely identify an action with respect to other actions defined by the consumer (101). Accordingly, in this embodiment, the data obtained from the probes (112, 114) is typically stored in a per-consumer buffer. If the tracing framework (106) is implemented on a multiprocessor system, then the data obtained from the probes (112, 114) is typically stored in a per-consumer per-CPU buffer. Alternatively, if the EPIDs are defined on a per-system basis, the tracing framework (106) typically includes functionality to uniquely define each action for each consumer such that each action, regardless of the consumer (101) with which it is associated, may be uniquely identified within the system.

In one embodiment of the invention, the EPID is an integer. Alternatively, the EPID may be represented using any alphanumeric string that is sufficient to identify the corresponding action on a per-consumer or a per-system basis.

Returning to FIG. 1, the source code (100) is subsequently forwarded, via the consumer (101) to a compiler (not shown), where the source code (100) is compiled to generate executable object code (102). The object code (102) is then communicated to a tracing framework (106). The tracing framework (106) includes functionality to execute the object code (102). Specifically, the tracing framework (106) interprets the object code (102) and directs the probe providers (110) to activate certain probes (112, 114) within the instrumented program (115). In addition, the tracing framework (106) may include functionality to associate each action, identified by an EPID, with a probe (112, 114).

Figure 3:
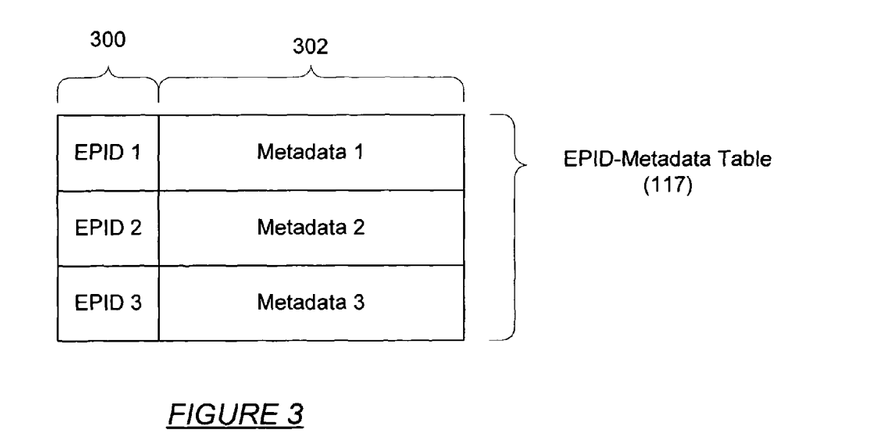
FIG. 3 shows an enabled probe identification ("EPID")-Metadata table layout in accordance with one embodiment of the invention.

In addition, the tracing framework (106) may include functionality to generate and populate an EPID-Metadata table (117) or a corresponding data structure that includes metadata defining the data layout of the data associated with a given EPID. The metadata information may be extracted from the source code (100), the object code (102), or obtained from a combination of data structures within the tracing framework (106). Further, the EPID-Metadata table (117) may be defined statically, or alternatively, the EPID-Metadata may be determine dynamically as required/requested by the tracing framework (106) or the consumer (101). Refer to FIG. 3 below for additional details regarding the EPID-Metadata table (117).

Continuing with the discussion of FIG. 1, the probes (112, 114) gather the specified information from the instrumented program (115), as defined by the object code (102) derived from the actions defined within the source code (100), and forward the information (directly or indirectly) to a corresponding buffer (116). The buffer (116), or a related process analyzes the information and stores the information as a data set. An embodiment of the data set is described below with respect to FIG. 2. In one or more embodiments of the invention, the information gathered from the instrumented program includes the raw data as well as additional ancillary data that is used by the tracing framework to manage the data prior to storing it in a buffer.

Figure 2:
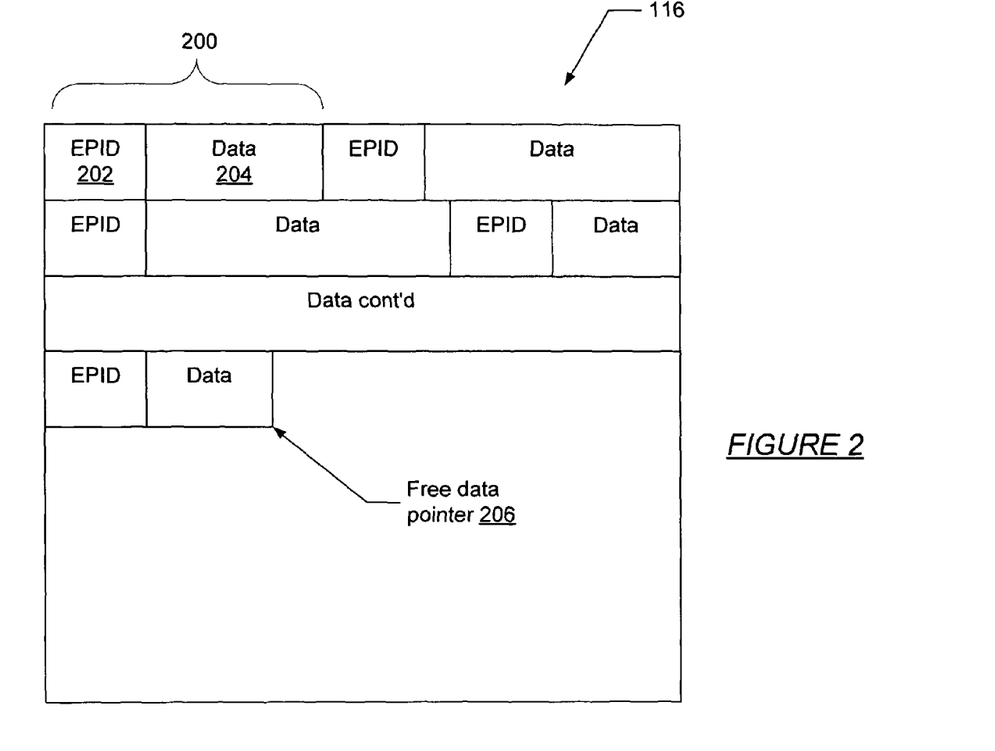
FIG. 2 shows a buffer layout in accordance with one embodiment of the invention.

FIG. 2 shows a buffer layout in accordance with one embodiment of the invention. As mentioned above, the data obtained from the probes (112, 114) is associated with an EPID and subsequently stored in the buffer (116). In one embodiment of the invention, the data and associated EPID are stored as a data set (200). The data set (200) includes an EPID (202) component followed by a data (204) component. In one or more embodiments of the invention, the data sets (200) are added to the buffer (116) at a free data pointer (206). Those skilled in the art will appreciate that the data (204) may be of any individual data type or an aggregate data type. Further, the data (204) may be individual pieces of data, or two or more pieces of data concatenated together. The exact composition of the data (204), as well as the layout of the data, is defined by the metadata associated with the EPID (202).

FIG. 3 shows an EPID-Metadata table layout in accordance with one embodiment of the invention. The EPID-Metadata table (117) includes a list of EPIDs (300) and associated metadata (302) defining the data layout of the data (204) associated with the EPID (202) in the buffer (116). The metadata (302) may include but is not limited to the enabled probe function, the enabled probe name, the enable probe module, the data size, the data layout, the data type, etc.

Figure 4:
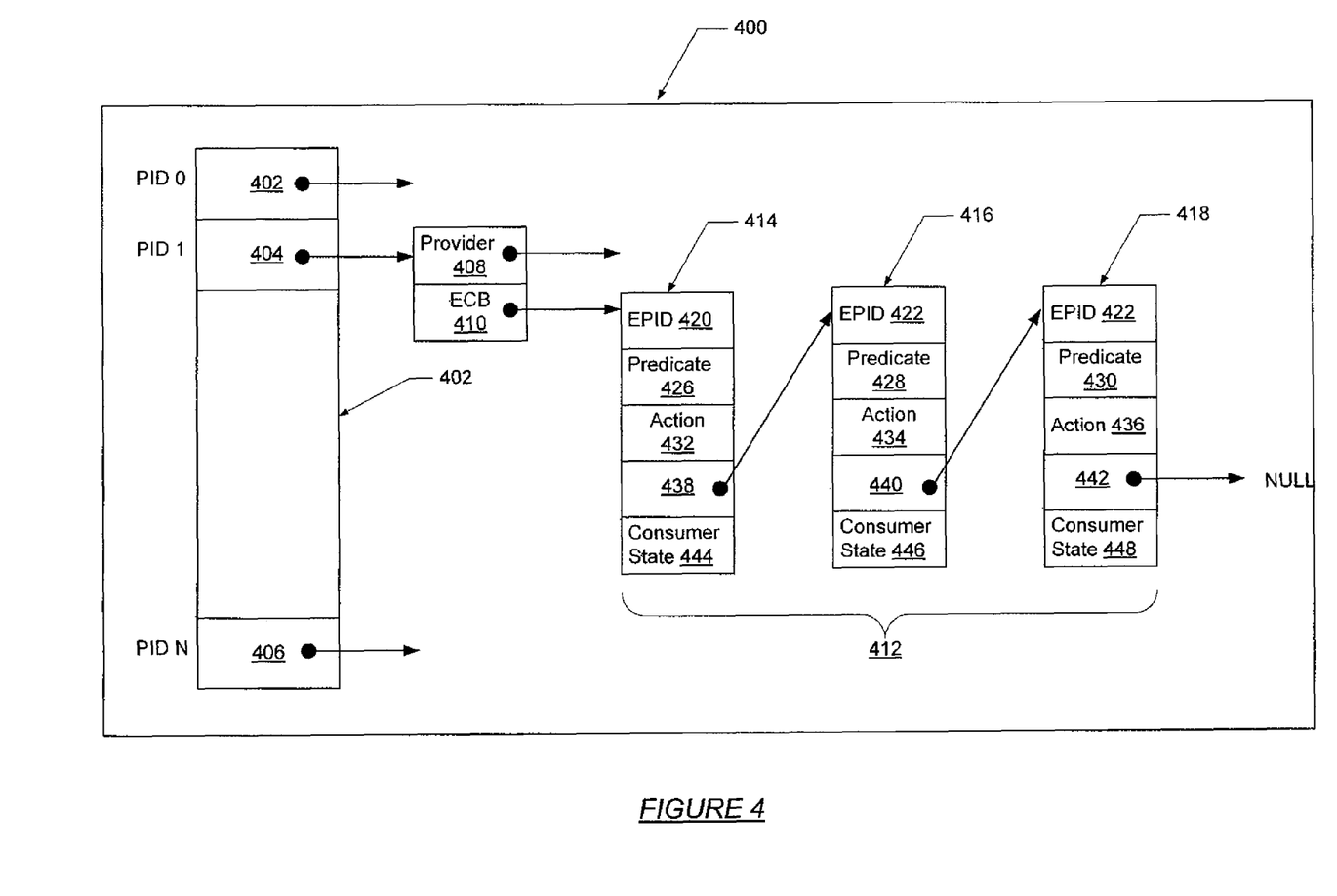
FIG. 4 shows a detailed view of a tracing framework in accordance with one embodiment of the invention.

FIG. 4 shows a detailed view of a tracing framework in accordance with one embodiment of the invention. The tracing framework (106) includes a global array (400) of pointers (402, 404, 406) indexed by probe identifiers ("PIDs") (PID 0, PID 1, PID N). As noted above, the instrumented program (115) may include one or more probes (112, 114), and each probe (112, 114) may perform one or more actions, when triggered, as defined by the consumer (101). Each probe (112, 114) is identified using a PID (402, 404, 406).

Each pointer (402, 404, 406) in the global array (400) is associated with a pointer (408) to a probe provider that enabled the probe (112, 114). In addition, the pointer (408) is also associated with a pointer (410) to an execution control block ("ECB") data structure (412). In one or more embodiments of the invention, the ECB data structure (412) is a linked list. Each element in the linked list corresponds to an ECB (414, 416, 418).

Conceptually, each ECB (414, 416, 418) corresponds to an action requested by a particular consumer (101) for a particular probe (11,2, 114). In one embodiment of the invention, each ECB (414, 416, 418) includes an EPID (420, 422, 424) uniquely identifying the ECB (414, 416, 418). Further, each ECB (414, 416, 418) includes a predicate (426, 428, 430) specifying criteria that is to be met prior to executing the associated action (432, 434, 436). In addition, each ECB also includes a consumer state (444, 446, 448) component that provides information about the consumer (101) that is associated with the particular ECB (414, 416, 418). If the ECB (412) data structure is implemented using a linked list data structure, then each ECB (414, 416, 418) also includes a pointer (438, 440) to the next ECB (414, 416, 418) or a pointer (442) to NULL.

Those skilled in the art will appreciate an ECB may be defined to include more components than those described above or to include a subset of the components described above. Further, the information associated within each ECB may reside with each ECB, or alternatively, the information associated with each ECB may be stored in a location remote to the ECB with the each ECB having a pointer (or pointers) to the information associated with the ECB.

Figure 5:
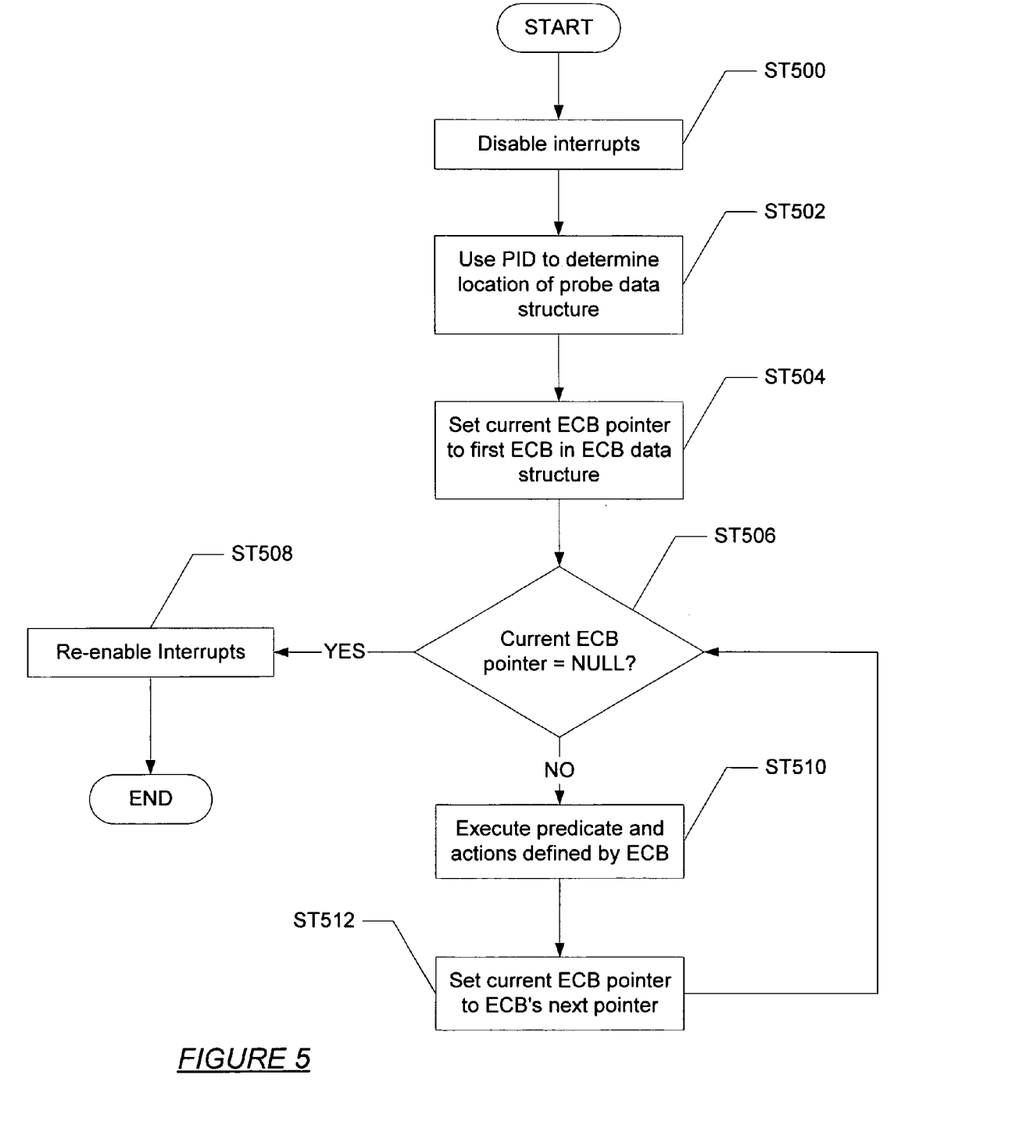
FIG. 5 shows a flowchart in accordance with one embodiment of the invention.

FIG. 5 shows a flowchart in accordance with one embodiment of the invention. Specifically, FIG. 5 shows a flowchart detailing the operation of the tracing framework and the ECBs in accordance with one embodiment of the invention. Initially, the CPU upon which the probe (112, 114) is triggered (i.e., the probe (112,114) is encountered during the execution of the instrumented program (115)) disables interrupts (Step 500). The PID associated with the probe (112, 114) is used as an index into the global array to obtain a pointer (402, 404, 406) to the associated probe data structures (i.e., the pointer (408) to the probe provider and the pointer (410) to the ECB data structures (412)) (Step 502). Using the information obtained for Step 502, a current ECB pointer (not shown) is set to the first ECB (414, 416, 418) in the ECB data structure (412) (Step 504). In one embodiment of the invention, the current ECB pointer is a data structure maintained by the tracing framework which points to the ECB that the tracing framework is currently executing.

If the value of the current ECB pointer is null (Step 506) (i.e., there is no ECB (414, 416, 418) associated with the particular probe (112, 114)), then the interrupts are re-enabled (Step 508) and the instrumented program (115) continues executing. If the current ECB pointer is not NULL (Step 506) (i.e., one or more ECBs (414, 416, 418) are defined for the particular probe (112, 114)), then the predicate (426, 428, 430) and the action (432, 440, 436) are performed, as specified by the ECB (414, 416, 418) (Step 510). Once the ECB (414, 416, 418) has finished executing, the current ECB pointer is set to the ECB's pointer (438, 440, 442) to the next ECB (414, 416, 418) (Step 512). Steps 506-512 are repeated until the current ECB pointer equals NULL (i.e., the tracing framework (106) has executed all the ECBs (414, 416, 418) associated the particular probe (112, 114)).

Figure 6:
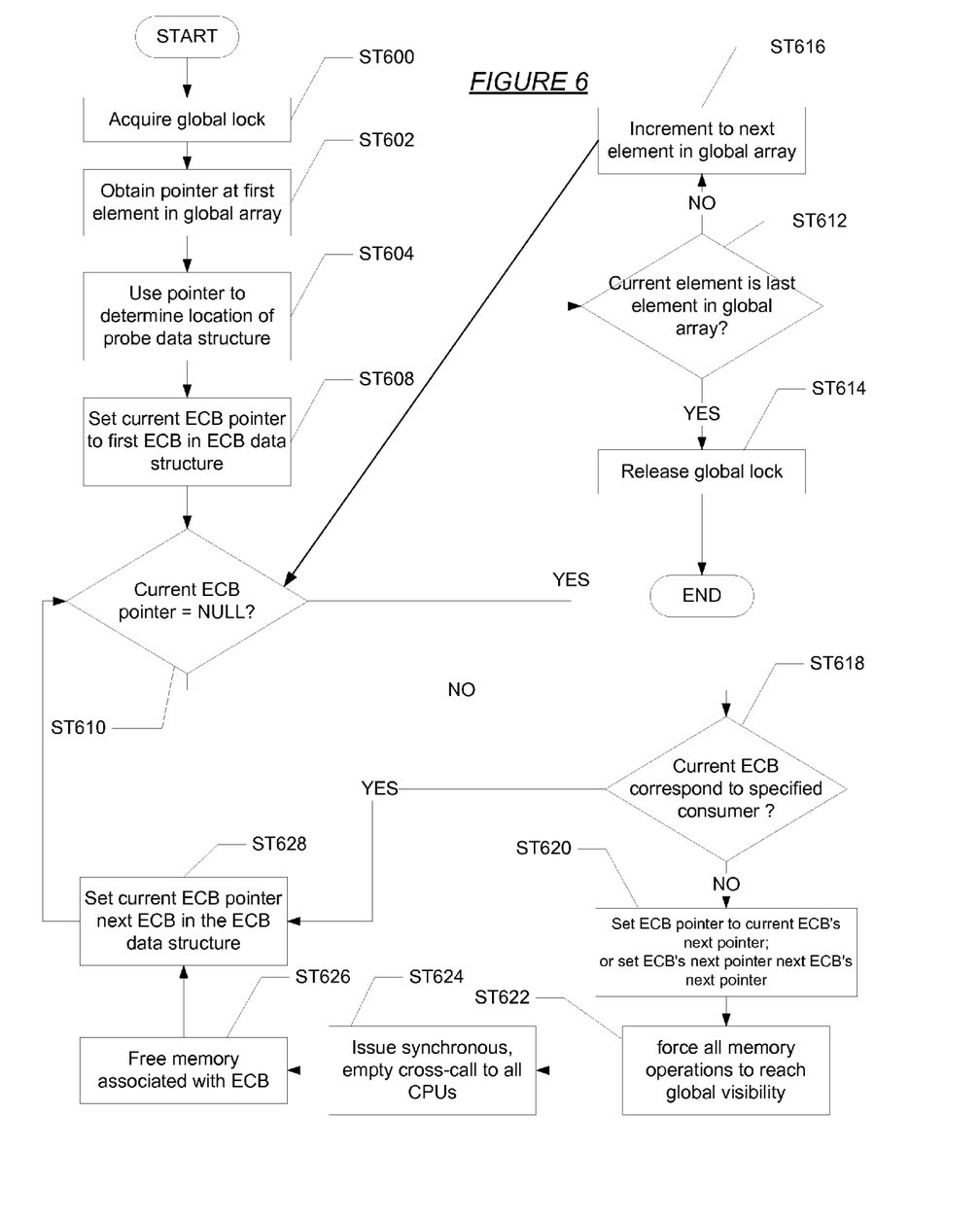
FIG. 6 shows a flowchart in accordance with one embodiment of the invention.

FIG. 6 shows a flowchart in accordance with one embodiment of the invention. More specifically, FIG. 6 shows a flowchart detailing a method for removing ECBs associated with a consumer that has ceased tracing in accordance with one embodiment of the invention. Initially, a global lock is acquired (Step 600). The pointer (402) located in the first element of the global array (400) is subsequently obtained (Step 602) and used to determine the location of the associated probe data structures (e.g., the pointer (408) to the probe provider and the pointer (408) to the ECB data structure (412)) (Step 604). The current ECB pointer is then set to the first ECB in the ECB data structure (412) (Step 608). If the current ECB pointer is NULL (Step 610), then the tracing framework (106) determines if the current element in the global array is the last element in the global array (400) (Step 612). If there are no remaining elements in the global array (400), then the global lock is released (Step 614). However, if there are additional unprocessed elements remaining in the global array (400), the global array (410) is incremented to the next element (Step 616) and proceeds to Step 610.

If the current ECB pointer is not NULL (Step 610), then the ECB at the current ECB pointer is analyzed to determine if the ECB is associated with the consumer who is ceasing tracing (Step 618). In one or more embodiments of the invention, the aforementioned analysis is preformed using information from the consumer state (444, 446, 448) component of the ECB (414, 416, 418). If the ECB is associated with the consumer (101) who is ceasing tracing (Step 618), then the pointer (410) to the ECB data structure (412) is set to the ECB's pointer (438, 440, 442) to the next ECB or the ECB's pointer (438, 440, 442) to the next ECB is set to the next ECB's pointer to the next ECB (Step 620). Note, pointer (410) to the ECB data structure (412) is set to the ECB's pointer (438, 440, 442) to the next ECB when the ECB to be removed is the first ECB in the ECB data structure (412). Further, the ECB's pointer (438, 440, 442) to the next ECB is set to the next ECB's pointer to the next ECB when the ECB to be removed is not the first ECB in the ECB data structure (412).

Continuing with the description of FIG. 6, once the pointers have been updated per Step 620, the memory operations are all forced to reach global visibility (Step 622). Thus, once a memory operation has been forced to global visibility, each CPU sees the same value for the same memory address (i.e., each CPU sees the updated values for the pointers performed in Step 620).

A synchronous empty cross-call is then issued to all CPUs in the system (Step 624). Conceptually, the empty cross-call "pings" each of the CPUs within the system and waits for a response. Because of the manner in which the actions associated with a probe are executed when a probe is triggered, namely disabling and enabling interrupts, the empty-cross call provides an efficient means to determine if a given CPU is executing in an ECB or is executing the instrumented program outside an ECB. Thus, when the empty-cross call is issued, all CPUs executing outside the instrumented program outside the ECB will acknowledge the "ping." However, those executing in an ECB will not acknowledge the "ping" until all ECBs associated with the triggered probe have completed executing. At that time, the CPU previously executing the ECBs will acknowledge the "ping." In this manner, the tracing framework can ensure that once a "ping" has been received by each CPU within the system that no CPU is executing in the ECB that is to be removed.

Continuing with the discussion of FIG. 6, the tracing framework then proceeds to free the memory associated with ECB that is to be removed (Step 626). The current ECB pointer is then set to the next ECB in the data structure (Step 628). Steps 610-628 are then repeated until all ECBs associated with the consumer that has ceased tracing are removed.

Figure 7:
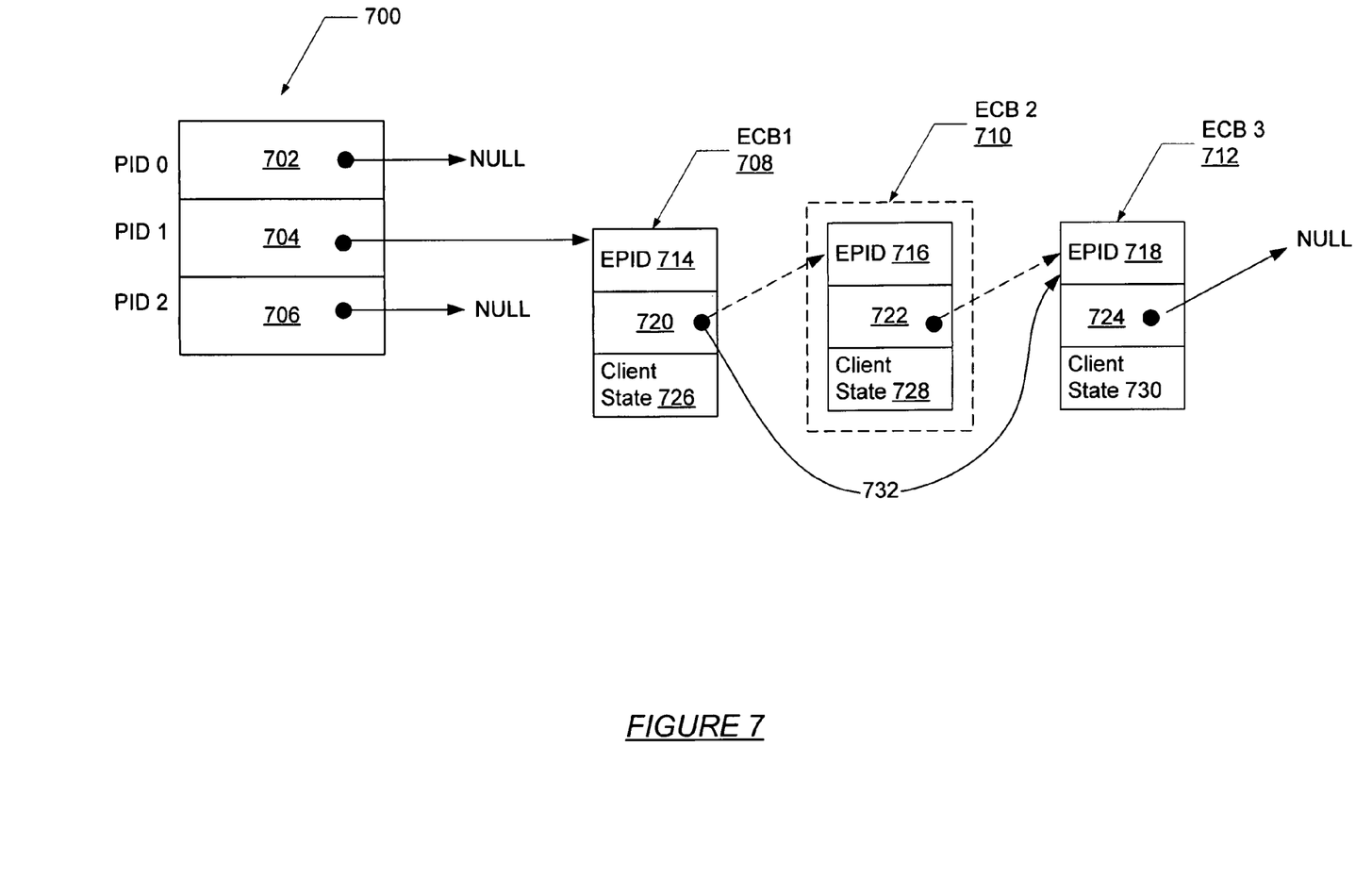
FIG. 7 shows a flow diagram in accordance with one embodiment of the invention.

FIG. 7 shows a flow diagram in accordance with one embodiment of the invention. More specifically, FIG. 7 shows an example of an implementation of an embodiment of the invention. In this example, a global array (700) includes three pointers (702, 704, 706) indexed by PID 0, PID 1, and PID 2, respectively. The pointer (702) associated with PID 0 and the pointer associated with PID 2 (706) are not associated any ECBs. However, the pointer (704) associated with PID 1 is associated with three ECBs (708, 710, 712). Note that other data structures associated with the ECBs and the tracing framework have been omitted from FIG. 7 to not obscure the discussion of the example. Each ECB (708, 710, 712) is identified by an EPID (714, 716, 718) and includes a predicate (not shown) and an action (not shown). Each ECB also includes a consumer state (726, 728, 730) component. In addition, each ECB (714, 716, 718) includes a pointer (720, 722) to the next ECB (714, 716, 718) or a pointer (724) to NULL.

In this particular example, ECB 2 (710) is to be removed. Thus, in accordance with the embodiment shown in FIG. 6, the pointer (720) from ECB 1 (708) to ECB 2 (710) is replaced with a pointer (732) from ECB 1 (708) to ECB 3 (712). After the memory operations (i.e., the updated value of the pointer (720) from ECB 1 (708) to ECB 3 (712)) are forced to global visibility, then an empty cross-call is issued. Once the empty cross-call is acknowledged by each CPU in the system, the memory associated with ECB 2 (710) and the associated data structures (e.g., pointer (722) to next ECB) is freed.

Those skilled in the art will appreciate that while embodiments of the invention have been described with respect to a linked list, any data structure may be used to represent the various components of the invention. Further, the various components of the invention may be located on a single machine or distributed across two or more machines.

The invention provides an efficient means to multiplex a probe in an instrumented program. Further, the invention provides a means for synchronizing a multiplexed probe. In addition, the invention provides a means for allowing multiple consumers to enable multiple probes, where each probe is enabled by more than one consumer. Further, the invention provides a means for removing a consumer, and the associated data structures on the different probes without requiring synchronization primitives and dispatching operations.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing a probe, comprising:
    triggering the probe in an instrumented program;
    querying a global array to determine an execution control block associated with the probe; and
    executing the execution control block to obtain data,
    wherein the execution control block is an element in a linked list which comprises:
        a predicate defining a criterion for executing the execution control block;
        a consumer state component defining information associated with a tracing consumer; and
        an action defining the data to be obtained from the instrumented program at the probe.

2. A method of claim 1, further comprising:
    associating the probe with a probe identifier.

3. The method of claim 2, wherein the probe identifier is used to query the global array.

4. A method of claim 2, further comprising:
    associating the execution control block with the probe identifier.

5. The method of claim 1, wherein the execution control block further comprises:
    a pointer to a next execution control block.

6. The method of claim 1, further comprising:
    disabling an interrupt prior to executing the execution control block; and
    enabling the interrupt when executing the execution control block is completed.

7. A method for removing an execution control block associated with a tracing consumer from a linked list executing in a system, wherein the linked list has a first pointer pointing to the execution control block and the execution control block has a next pointer, comprising:
    updating the linked list such that the first pointer is updated to point to same location as the execution control block's next pointer, wherein the execution control block comprises:
        a predicate defining a criterion for executing the execution control block,
        a consumer state component defining information associated with a tracing consumer, and
        an action defining the data to be obtained from the instrumented program at the probe;
    issuing an empty cross-call and awaiting an acknowledgement from each processor in the system; and
    freeing memory associated with the execution control block when the acknowledgement from each processor has been received.

8. The method of claim 7, further comprising:
    forcing a memory operation associated with updating the linked list to global visibility prior to issuing the empty cross-call.

9. The method of claim 7, further comprising:
    searching for the execution control block to remove using the consumer state component.

10. A system for tracing an instrumented program, comprising:
    a processor; and
    a memory configured by the processor to store:
        the instrumented program comprising a first probe, wherein the first probe is identified using a first probe identifier, and
        a first execution control block associated with the first probe comprising a first action to be performed when the first probe is triggered in the instrumented program,
    wherein the first execution control block is an element in a linked list which comprises:
        a predicate defining a criterion for executing the execution control block,
        a consumer state component defining information associated with a tracing consumer, and
        an action defining the data to be obtained from the instrumented program at the probe.

11. The system of claim 10, wherein the memory is further configured by the processor to store:
    a tracing consumer defining the action.

12. The system of claim 10, wherein the memory is further configured by the processor to store:
    a second execution control block associated with the first probe comprising a second action to be performed when the first probe is triggered in the instrumented program.

13. The system of claim 12, wherein the memory is further configured by the processor to store:
    a second probe, wherein the second probe is identified using a second probe identifier; and
    a third execution control block associated with the second probe comprising a third action to be performed when the second probe is triggered in the instrumented program.

14. The system of claim 13, wherein the memory is further configured by the processor to store:
    a global array of pointers indexed using the first probe identifier and the second probe identifier.

15. The system of claim 10, wherein the first execution control block further comprises:
    a pointer to a next execution control block.

* * * * *